US012632724B2

(12) United States Patent (10) Patent No.: US 12,632,724 B2
Dash et al. (45) Date of Patent: May 19, 2026

(54) CANONICALIZATION OF DATA WITHIN OPEN KNOWLEDGE GRAPHS

(71) Applicant: International Business Machines Corporation, Armonk, NY (US)

(72) Inventors: Sarthak Dash, Jersey City, NJ (US); Gaetano Rossiello, Brooklyn, NY (US); Nandana Mihindukulasooriya, Cambridge, MA (US); Sugato Bagchi, White Plains, NY (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 17/480,270

(22) Filed: Sep. 21, 2021

(65) Prior Publication Data

US 2023/0087667 A1 Mar. 23, 2023

(51) Int. Cl.
*G06N 3/08* (2023.01)
*G06F 40/40* (2020.01)
*G06N 5/022* (2023.01)

(52) U.S. Cl.
CPC .............. *G06N 3/08* (2013.01); *G06N 5/022* (2013.01); *G06F 40/40* (2020.01)

(58) Field of Classification Search
CPC .......... G06N 3/08; G06N 5/022; G06F 40/40
See application file for complete search history.

(56) References Cited

U.S. PATENT DOCUMENTS

| | | | | |
|---|---|---|---|---|
| 10,127,289 | B2 | 11/2018 | Manning | |
| 11,830,476 | B1 * | 11/2023 | Karanasou | .......... G06N 3/0455 |
| 2019/0294732 | A1 | 9/2019 | Srinivasan | |
| 2021/0224610 | A1 * | 7/2021 | Jha | ......................... G06N 3/045 |
| 2021/0357585 | A1 * | 11/2021 | Surdeanu | ............. G06F 40/295 |
| 2022/0300831 | A1 * | 9/2022 | Friede | ................... G06N 5/022 |

OTHER PUBLICATIONS

Luis Galarraga, et al. "Canonicalizing Open Knowledge Bases", Nov. 3, 2014 (Year: 2014).*
Quan Wang, Bin Wang, Li Guo, "Knowledge Base Completion Using Embeddings and Rules", 2015 (Year: 2015).*
Yan Liang, Xin Liu, Jianwen Zhang, Yangqiu Song, "Relation Discovery with Out-of-Relation Knowledge Base as Supervision", Apr. 19, 2019 (Year: 2019).*
Chaoyang Xu, Yuanfei Dai, Renjie Lin, Shiping Wang, "Deep clustering by maximizing mutual information in variational auto-encoder", Jul. 16, 2020 (Year: 2020).*
Zheng-Xin Yong, Tiago Timponi Torrent, "Semi-supervised Deep Embedded Clustering with Anomaly Detection for Semantic Frame Induction", May 2020 (Year: 2020).*

(Continued)

*Primary Examiner* — Viker A Lamardo
*Assistant Examiner* — David H Tran
(74) *Attorney, Agent, or Firm* — Michael O'Keefe

(57) ABSTRACT

Embodiments of the present invention provide computer-implemented methods, computer program products and computer systems. Embodiments of the present invention can, in response to receiving information, learn entity representations and cluster assignments of respective entity representations in a joint manner for both entities and relations of respective entities.

17 Claims, 7 Drawing Sheets

(56)         References Cited

OTHER PUBLICATIONS

Pushpendre Rastogi, Adam Poliak, Vince Lyzinski, Benjamin Van Durme, "Neural variational entity set expansion for automatically populated knowledge graphs" Oct. 25, 2018 (Year: 2018).*
Bovi et al., "Knowledge Base Unification via Sense Embeddings and Disambiguation", Proceedings of the 2015 Conference on Empirical Methods in Natural Language Processing, 2015, 11 pages, <https://www.aclweb.org/anthology/D15-1084.pdf>.
Broscheit et al., "Can We Predict New Facts with Open Knowledge Graph Embeddings? A Benchmark for Open Link Prediction", Proceedings of the 58th Annual Meeting of the Association for Computational Linguistics, Jul. 5-10, 2020, 13 pages, <https://www.aclweb.org/anthology/2020.acl-main.209.pdf>.
Dash et al., "Joint Entity and Relation Canonicalization in Open Knowledge Graphs using Variational Autoencoders", Grace Period Disclosure, arXiv:2012.04780v1 [cs.CL] Dec. 8, 2020, 11 pages.
Galarraga et al., "Canonicalizing Open Knowledge Bases", Copyright 2014 ACM 978-1-4503-2598-1/14/11, 10 pages, <http://luisgalarraga.de/docs/km1298-galarraga.pdf>.
Gupta et al., "CaRe: Open Knowledge Graph Embeddings", Proceedings of the 2019 Conference on Empirical Methods in Natural Language Processingand the 9th International Joint Conference on Natural Language Processing, 2019, 11 pages, <https://www.aclweb.org/anthology/D19-1036.pdf>.
Jiang et al., "Canonicalizing Open Knowledge Bases with Multi-Layered Meta-Graph Neural Network", arXiv:2006.09610v1 [cs.CL] Jun. 17, 2020, 7 pages, <https://arxiv.org/pdf/2006.09610.pdf>.
Jiang et al., "Variational Deep Embedding: An Unsupervised and Generative Approach to Clustering", arXiv:1611.05148v3 [cs.CV] Jun. 28, 2017, 22 pages, <https://arxiv.org/pdf/1611.05148.pdf>.

Krishnamurthy et al., "Which Noun Phrases Denote Which Concepts?", Proceedings of the 49th Annual Meeting of the Association for Computational Linguistics: Human Language Technologies, 2011, 11 pages, <https://www.aclweb.org/anthology/P11-1058.pdf>.
Lin et al., "Canonicalization of Open Knowledge Bases with Side Information from the Source Text", 2019 IEEE 35th International Conference on Data Engineering (ICDE), 2019, DOI 10.1109/ICDE.2019.00089, 12 pages.
Lin et al., "KBPearl: A Knowledge Base Population System Supported by Joint Entity and Relation Linking", Proceedings of the VLDB Endowment 13, No. 7, 2020, 15 pages, <https://doi.org/10.14778/3384345.3384352>.
Pal et al., "Co-Clustering Triples from Open Information Extraction", Proceedings of the 7th ACM IKDD CoDS and 25th COMAD, 2020, 5 pages, <https://doi.org/10.1145/3371158.3371183>.
Vashishth et al., "Cesi: Canonicalizing Open Knowledge Bases using Embeddings and Side Information", Proceedings of the 2018 World Wide Web Conference. 2018, ACM ISBN 978-1-4503-5639-8/18/04, 10 pages, <http://malllabiisc.github.io/publications/papers/cesi_www18.pdf>.
Wu et al., "MULCE: Multi-level Canonicalization with Embeddings of Open Knowledge Bases", International Conference on Web Information Systems Engineering, 2020, 13 pages.
Yates et al., "Unsupervised Methods for Determining Object and Relation Synonyms on the Web", Journal of Artificial Intelligence Research 34 (2009): 255-296, Submitted Oct. 2008; published Mar. 2009, <https://www.aaai.org/Papers/JAIR/Vol34/JAIR-3408.pdf>.
Zhu et al., "Iterative Entity Alignment via Joint Knowledge Embeddings", IJCAI. vol. 17. 2017, Aug. 2017, 8 pages, <https://www.researchgate.net/profile/Hao_Zhu31/publication/318830326_Iterative_Entity_Alignment_via_Joint_Knowledge_Embeddings/links/598afe10aca27243585a115e/Iterative-Entity-Alignment-via-Joint-Knowledge-Embeddings.pdf>.

* cited by examiner

600

700

| | Macro F1 | Micro F1 | Pair F1 | Average |
|---|---|---|---|---|
| CESI [1] | 0.627 | 0.844 | 0.819 | 0.763 |
| MGNN+SI [2] | 0.667 | 0.863 | 0.812 | 0.781 |
| Our Approach | 0.661 | 0.864 | 0.843 | 0.789 |

CANONICALIZATION OF DATA WITHIN OPEN KNOWLEDGE GRAPHS

STATEMENT REGARDING PRIOR DISCLOSURES BY THE INVENTOR OR A JOINT INVENTOR

The following disclosure(s) are submitted under 35 U.S.C. § 102(b)(1)(A):

DISCLOSURE(S)

(1) Sarthak Dash, Gaetano Rossiello, Nandana Mihindukulasooriya, Sugato Bagchi, Alfio Gliozzo, "Joint Entity and Relation Canonicalization in Open Knowledge Graphs using Variational Autoencoders", submitted on arXiv, Dec. 8, 2020.

BACKGROUND

The present invention relates generally data learning technology and more specifically to Canonicalizing Using Variational AutoEncoders (CUVA) learns unique embeddings for noun phrases and cluster assignments.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

In machine learning, a hyperparameter is a configuration that is external to the model and whose value cannot be estimated from data. Hyperparameters are used in processes to help estimate model parameters. Hyperparameter are set before the learning (e.g., training) process begins by contrast, the values of other parameters are derived via training. Different model training algorithms require different hyperparameters, some simple algorithms, such as least squares regression, require none. Given a set of hyperparameters, a training algorithm learns the parameter values from the data for instance, least absolute shrinkage and selection operator (LASSO) is an algorithm that adds a regularization hyperparameter to least squares regression, required to be set before estimating the parameters through the training algorithm. Similar machine learning models can require different hyperparameters (e.g., different constraints, weights, or learning rates) to generalize different data patterns.

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "cat" or "not cat" and using the results to identify cats in other images. NNs accomplish this without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer) to the last layer (the output layer), possibly after traversing the layers multiple times.

SUMMARY

According to an aspect of the present invention, there is provided a computer-implemented method. The computer implemented method comprises: in response to receiving information, learning entity representations and cluster assignments of respective entity representations in a joint manner for both entities and relations of respective entities.

BRIEF DESCRIPTION OF THE DRAWINGS

Preferred embodiments of the present invention will now be described, by way of example only, with reference to the following drawings, in which.

DETAILED DESCRIPTION

Figure 1:
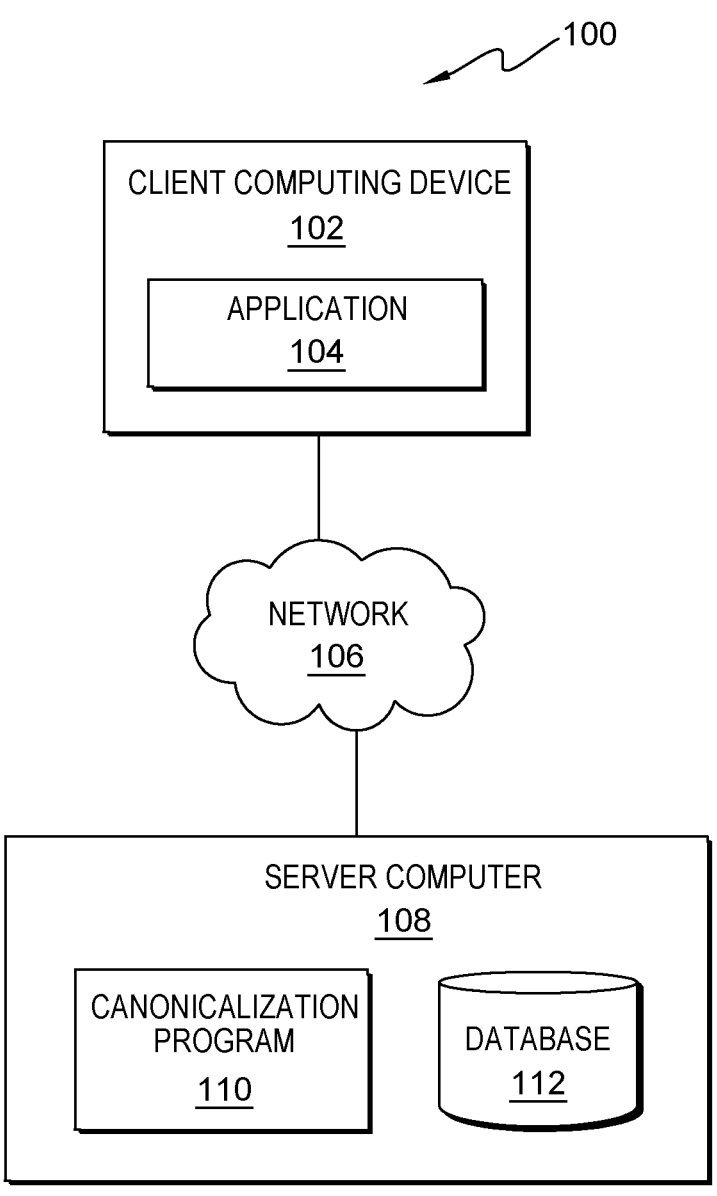
FIG. 1 depicts a block diagram of a computing environment, in accordance with an embodiment of the present invention.

Embodiments of the present invention recognize limitations with existing Knowledge Graphs (KGs). For example, knowledge graphs such as DBPedia, Wikidata, or Freebase are well-known manually constructed data sources that represent knowledge of real world as graphs of entities (nodes) and relations (edges). Typically, knowledge graphs function well when both entities and relations conform to a predefined schema but struggle when adapting to new specific domains. Current solutions (e.g., Open Information Extraction (OpenIE) systems) to the problem focus generating embedding representations for both noun and relation phrases and then utilize a clustering algorithm to group them using the embeddings as features. Despite this improvement to the adaptability of these systems, embodiments of the present recognize deficiencies in these methods. For example, using the above approaches, two noun phrases or relation phrases having difference surface forms (e.g., New York City and NYC) but refer to the same entity (or relation) in a canonical knowledge base are treated differently. This leads to suboptimal results because querying the open knowledge graph will not return facts associated with NYC when using New York City as the query. These approaches can also lead to the production of redundant and ambiguous subject-relation-object triples.

As such, embodiments of the present invention provide solutions for improving performance while operating on large open knowledge graphs. Specifically, embodiments of the present invention canonicalize noun phrases and relation phrases within an open knowledge graph. Embodiments of the present invention introduces Canonicalizing Using Variational AutoEncoders (CUVA), a neural architecture for the canonicalization task based on joint learning of entity and relation clusters using variational autoencoders. Specifically, embodiments of the present invention run a hierarchical agglomerative clustering on an entity set and a respective relation set separate, initialize the cluster means and cluster variances and train a neural network (e.g., training the encoder and the decoder) as discussed in greater detail later in this Specification. For example, embodiments of the present invention can group a list of triples consisting of noun phrases and relation phrases in such a way that all items belonging to the same cluster refer to a unique entity/relation (e.g., New York City, NYC, as belonging to the same cluster). In this manner, embodiments of the present invention help provide better search results when searching knowledge graphs, can help build better models downstream for natural language processing tasks (e.g., link prediction), and helps group together model predictions on tasks such as a faceted search for better performance. Embodiments of the present invention can also improve the functioning of a computer by reducing redundant information generated by traditional knowledge graphs which in turn requires less memory for storage.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access canonicalization program 110 (e.g., using TCP/IP) to access content, user information, and database information. Application 104 can further communicate with canonicalization program 110 to learns mention representations as well as cluster assignments in a joint fashion for both entities and relations, as discussed in greater detail in FIGS. 2-6.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts canonicalization program 110 and database 112. In this embodiment, canonicalization program 110 resides on server computer 108. In other embodiments, canonicalization program 110 can have an instance of the program (not shown) stored locally on client computer device 102. In other embodiments, canonicalization program 110 can be a standalone program or system that learns mention representations as well as cluster assignments in a joint fashion for both entities and relations. In yet other embodiments, canonicalization program 110 can be stored on any number or computing devices.

Canonicalization program 110 is an end-to-end model that learns mention representations as well as cluster assignments in a joint fashion for both entities and relations (as opposed to existing approaches that learn mention representations first and then cluster representations in an independent separate step). Canonicalization program 110 achieves this by canonicalizing entity and relations mentions from Open IE triples obtained from a text corpora. More specifically, given a list of triples, canonicalization program 110 runs a hierarchical agglomerative clustering on the entity set (e.g., the list of triples), and the relation set separately, initialize the cluster means and cluster variances at the "Mixture of Gaussians" layer, and training the neural network (e.g., training the encoder (keeping the decoder fixed) and training the decoder (keeping the encoder fixed)) as discussed in greater detail later in FIGS. 2-6.

For example, canonicalization program 110 can access a corpus via OpenIE reproduced in Example Table 1 below:

Pcie x16 grpahics card
Express x16 graphics card
X16 graphics card
Optimum computer performance
Diagnostic programs
Thinkstation diagnostics
Thinkstation diagnostics program
Thinkpad tablet setup
Model tablet setup
Antenna cable connector
Antenna cable
Connector cable Example Table 1

Using the methods, computer program products, and computer systems disclosed herein, canonicalization program 110 can cluster entities, noun phrases, and relation phrases from Example Table 1 into five separate clusters reproduced below:

Cluster Output 1

Pcie x16 grpahics card
Express x16 graphics card
X16 graphics card

Cluster Output 2

Antenna cable connector
Antenna cable
Connector cable

Cluster Output 3

Thinkstation diagnostics
Thinkstation diagnostics program

Cluster Output 4

Thinkpad tablet setup
Model tablet setup

Cluster Output 5

Optimum computer performance
Diagnostic programs

In this embodiment, canonicalization program 110 canonicalizes entity and relation mentions from Open IE triples obtained from a text corpus by using a variational auto encoder (not shown) for entities which uses a mixture of Gaussians for clustering entity mentions. Canonicalization program 110 uses a second variational auto encoder (also not shown) for relation mentions which uses another mixture of Gaussians for clustering relation mentions. Finally, canonicalization program 110 uses another module (not shown) to complete a knowledge base (i.e., for knowledge base completion) that aims to make use of the structural knowledge present within open knowledge base of mentions.

Canonicalization program 110 then trains the resulting neural network architecture. In this embodiment, canonicalization program 110 builds a hierarchical agglomerative cluster model with complete linkage criterion using pretrained Glove embeddings. Canonicalization program 110 then trains the encoder section only (keeping the decoder fixed), by using the clustering results obtained from the hierarchical agglomerative clustering model as a source of weak supervision.

Canonicalization program 110 then trains the decoder sections only, while keeping the encoder fixed. Canonicalization program 110 also encodes a constraint loss, an object that enforces certain mention pairs to be close-by, i.e., within proximity of each other, in the embedding space.

Database 112 stores received information and can be representative of one or more databases that give permissioned access to canonicalization program 110 or publicly available databases. For example, database 112 can store generated or otherwise accessed Knowledge Graphs. In general, database 112 can be implemented using any nonvolatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2A:
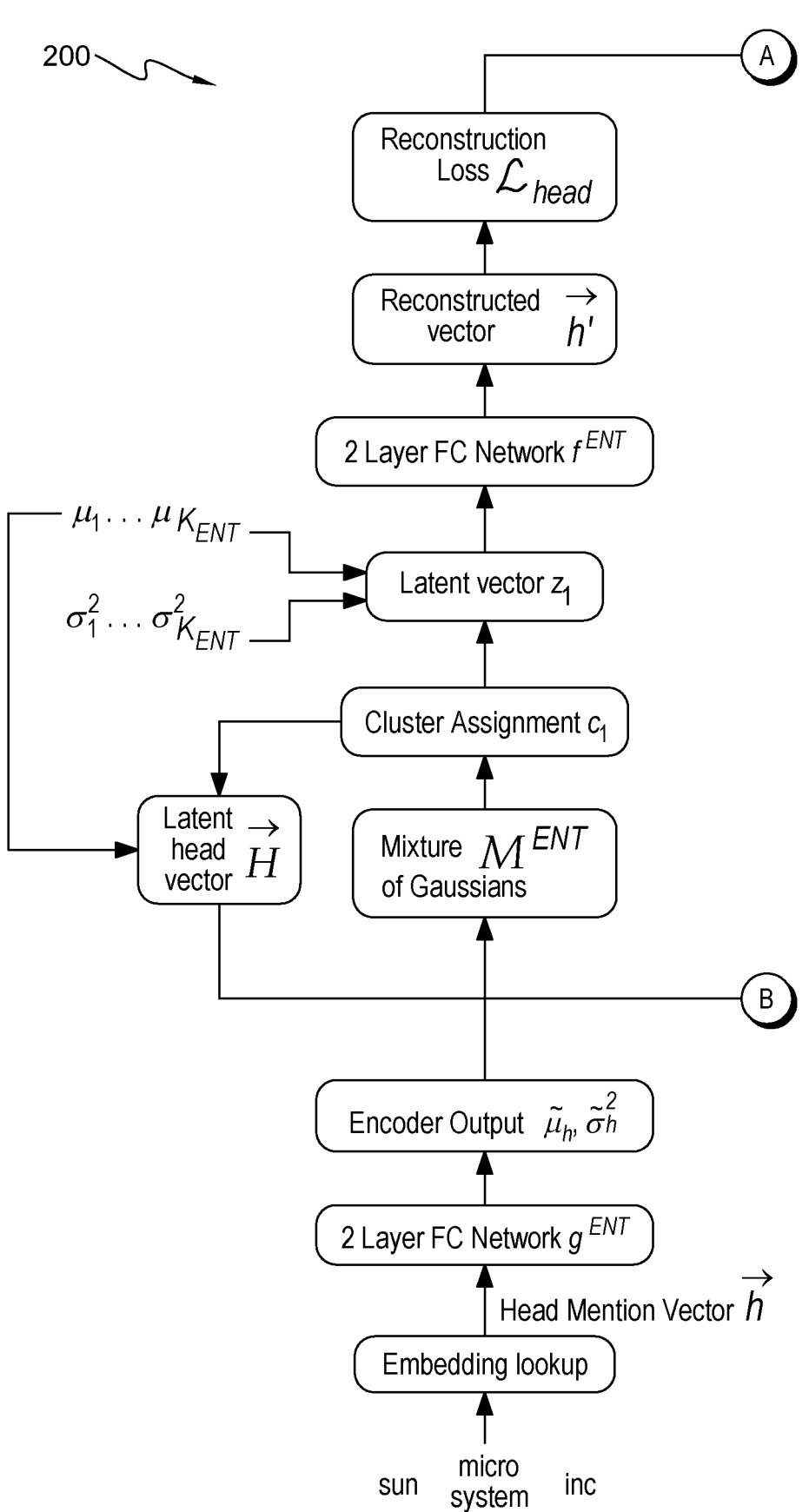
FIGS. 2A-C depict an architecture of a neural network for a canonicalization task, in accordance with an embodiment of the present invention.
Figure 2B:
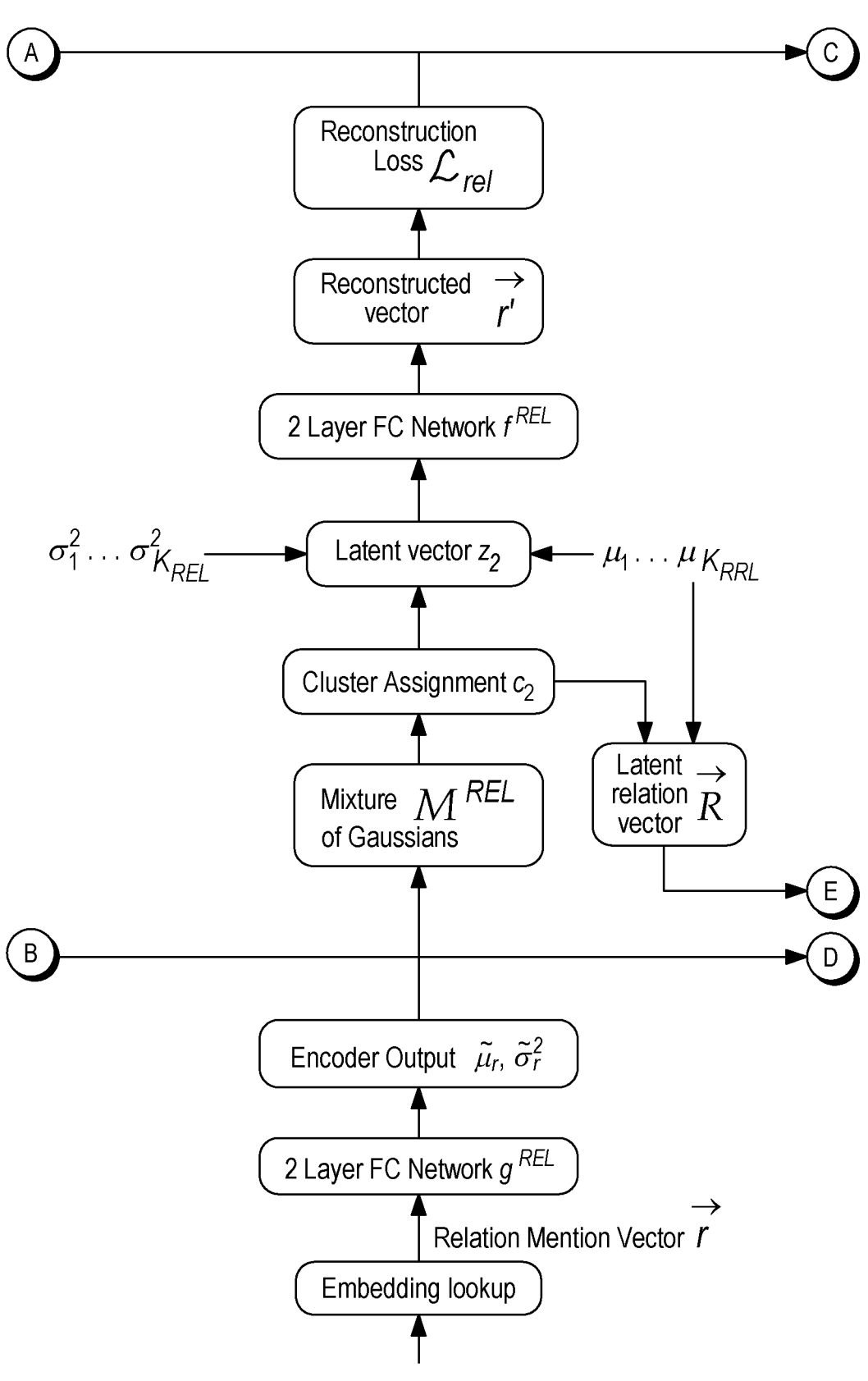
Figure 2C:
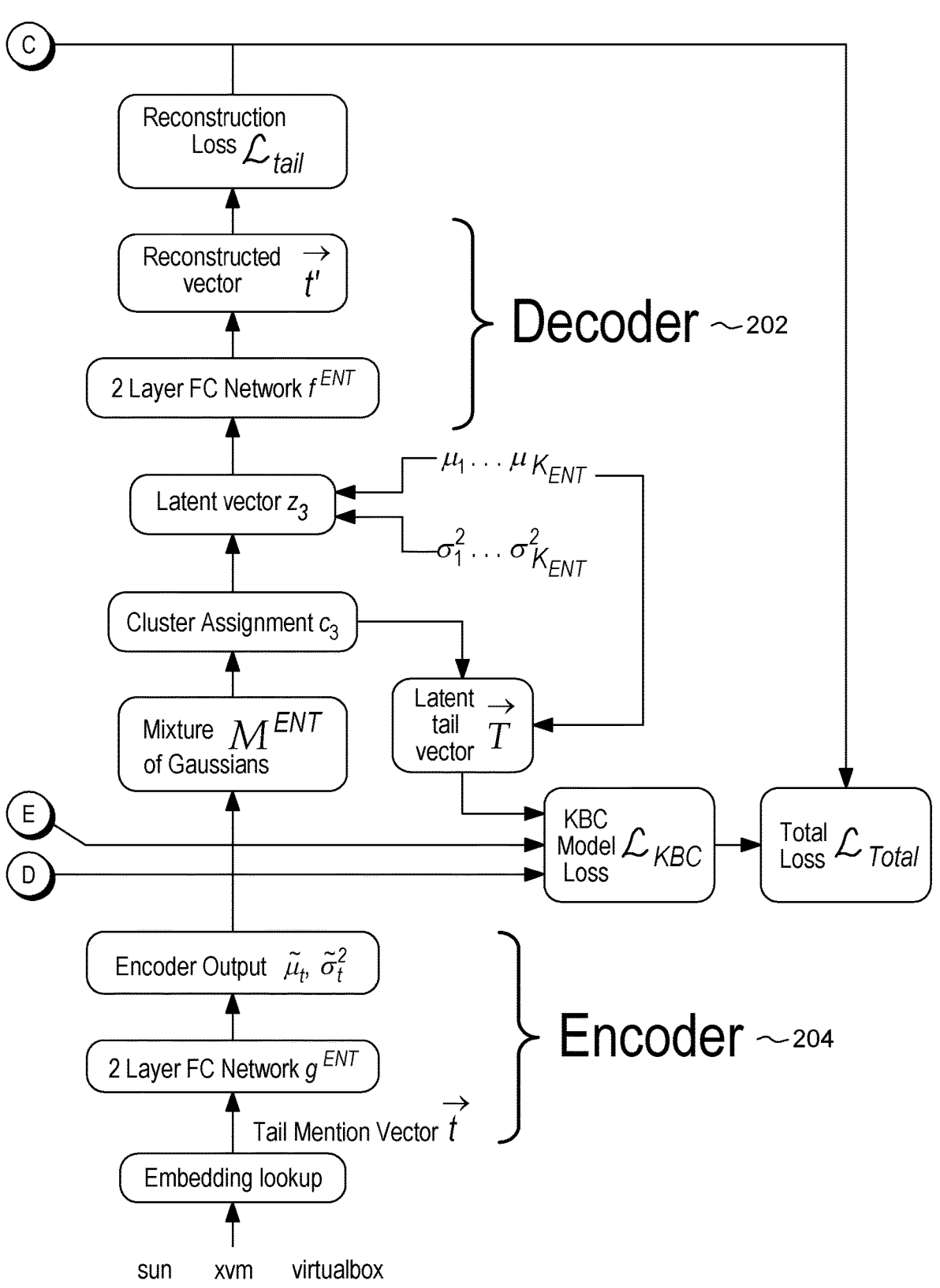

FIGS. 2A-C depict an architecture of a neural network for a canonicalization task, in accordance with an embodiment of the present invention.

More specifically, FIGS. 2A-C shows core structure 200 which represents the core structure of the Canonicalizing Using Variational AutoEncoders (CUVA). FIG. 2C depicts core structure 200 depicts encoder 204 and decoder 202.

In this embodiment, the left and right pillars correspond to the Entity variational autoencoder (E-VAE) for the tail Noun Phrases, whereas the middle pillar corresponds to the Relation variational autoencoder (R-VAE) for the Relation Phrase. A knowledge graph embedding module (KGE) module (not shown) connects both the E-VAE and the R-VAE.

This architecture depicts three clusters of input data within the exemplary graph 200 across FIGS. 2A, 2B, and 2C. Specifically, exemplary graph depicts, a head mention vector cluster, a relation mention cluster, and a tail mention cluster, where each cluster of data starts in an encoder section 204 that flowing into an embedding lookup, then flowing into a multi-layer network (i.e., two-layer FC network), and generating an encoder output for each cluster of input data. The output of each cluster of input data is transmitted to a mixture of gaussian algorithms to produce a cluster assignment for each cluster of input data by canonicalization program 110.

The produced cluster assignment of each cluster of input data is calculated into a latent vector, which is the first step of a decoder section 202. Decoder section 202 contains the latent vector flowing into a second multi-layer network, which generates a reconstructed vector for each cluster of input data. The final output of decoder section 202 is a calculated reconstruction loss for each cluster assignment associated with each cluster of input data (i.e., a reconstruction loss for the head mention vector cluster, a reconstruction loss for the relation mention cluster, and a reconstruction loss for the tail mention cluster. Canonicalization program 110 calculates a total loss value by aggregating the calculated reconstruction loss for each cluster of input data.

Figure 3:
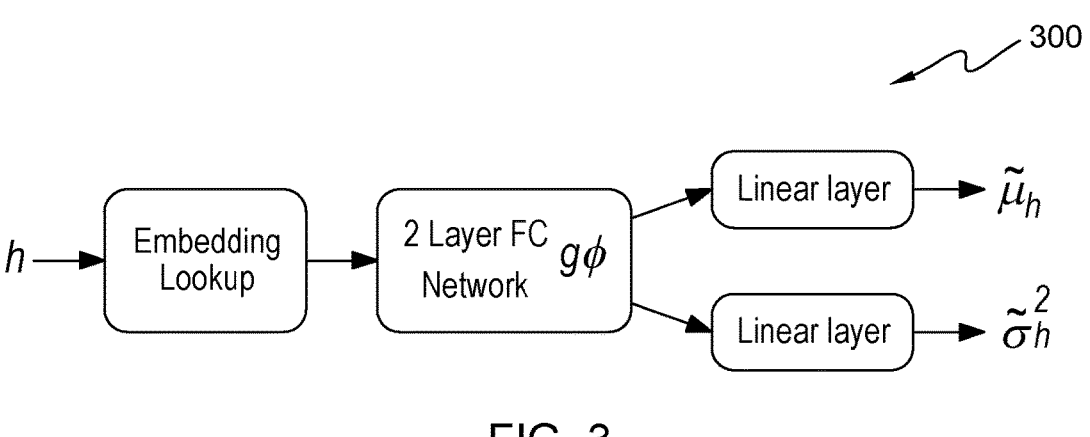
FIG. 3 illustrates an encoder block, in accordance with an embodiment of the present invention.

FIG. 3 illustrates an encoder block 300, in accordance with an embodiment of the present invention.

Figure 4:
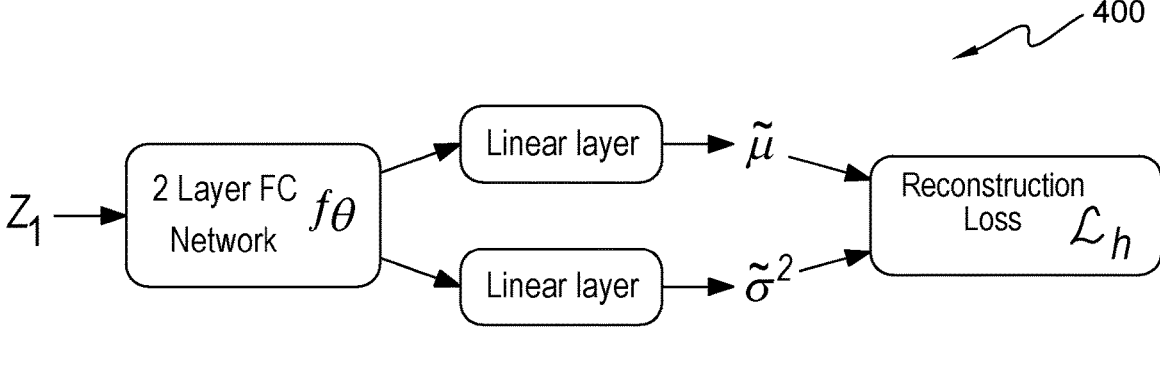
FIG. 4 depicts a decoder block, in accordance with an embodiment of the present invention.

Depicted herein, canonicalization program 110 identifies a Noun Phrase, h, as being fed as input to the Encoder block, which consists of: a) An embedding lookup table, b) A two layer fully connected neural network $g^E$ ($g^R$ for R-VAE) with tanh non-linearity, and c) Two linear layers in parallel FIG. 4 depicts a decoder block 400, in accordance with an embodiment of the present invention. In this example, canonicalization program 110 (e.g., Canonicalizing Using Variational AutoEncoders (CUVA)) uses separate fully connected networks $$f_\theta^E \text{ and } f_\theta^R$$

for E-VAE and R-VAE.

Figure 5:
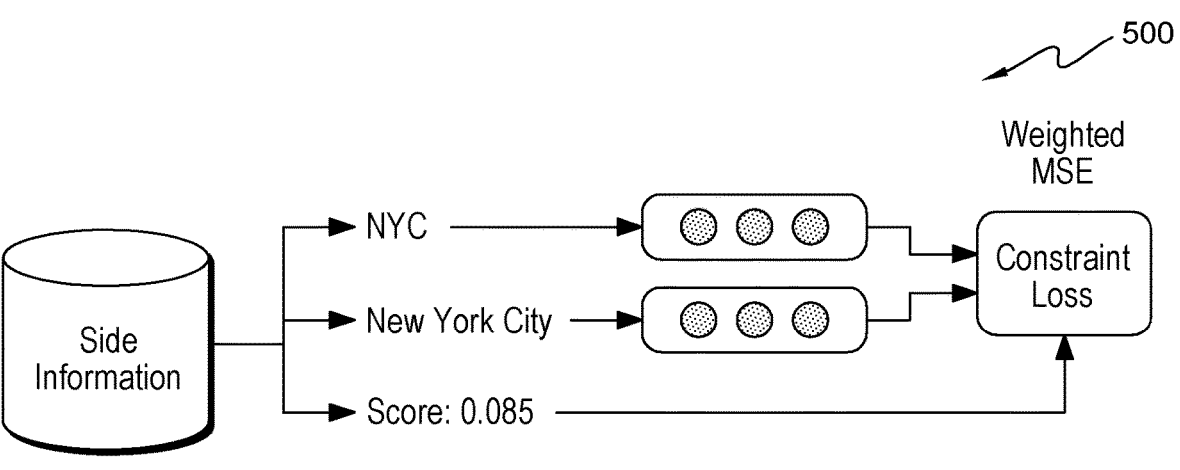
FIG. 5 is an example of encoding side information, in accordance with an embodiment of the present invention.

FIG. 5 is an example of encoding side information, in accordance with an embodiment of the present invention. Depicted herein is example 500 which shows encoding side Information as a loss measure. In this example, CUVA (e.g., canonicalization program 110) first performs an embedding lookup for the mentions NYC and New York City and then computes a Mean Squared Error (MSE) value weighted by its plausibility score. The MSE value indicates how far CUVA is from satisfying all the constraints represented as equivalent mention pairs. Finally, we sum up the weighted MSE values for all equivalent mention pairs, which comprises our Side Information Loss.

Figures 6, 7:
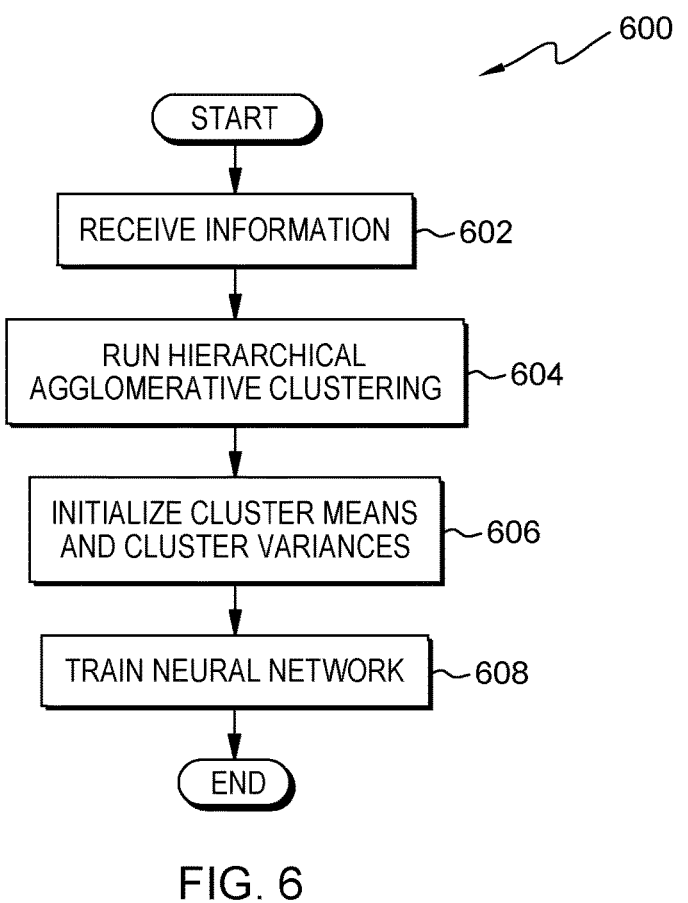
FIG. 6 is a flowchart depicting operational steps for training a neural network, in accordance with an embodiment of the present invention.
FIG. 7 is an example table depicting results of a canonicalization task, in accordance with an embodiment of the present invention.

FIG. 6 is a flowchart 600 depicting operational steps for training a neural network, in accordance with an embodiment of the present invention.

In step 602, canonicalization program 110 receives information. In this embodiment, the received information can include a request from client computing device 102 to process a text corpus such as a Knowledge Graph. In some embodiments, information received can include one or more sets of entities and respective relations. For example, canonicalization program 110 can receive a list of triples. In other embodiments, canonicalization program 110 can receive information from one or more other components of computing environment 100.

In step 604, canonicalization program 110 dynamically clusters received information using a hierarchical agglomerative algorithm. In this embodiment, canonicalization program 110 dynamically clusters the identified entity/relation mentions by using a hierarchical agglomerative clustering (HAC) algorithm over data by using pretrained GloVe embeddings to create clusters of entity/relation mentions. Note that, for entity/relation mentions with multiple tokens, canonicalization program 110 calculates the average of the unit-normalized GloVe embeddings, and then performs a grouping using a hierarchical agglomerative clustering algorithm.

In this embodiment, canonicalization program 110 uses two independent variational auto-encoders, one to model the entity mentions and the other to model the relation mentions. Each of these variational auto-encoders uses a Mixture-of-Gaussians algorithm within its latent space, which in turn generates clusters for entity/relation mentions respectively. Furthermore, the representations within the latent space affect each other via a Knowledge-Graph-Embedding (KBC) module, which encodes the structural aspect of the associated Open KG.

In step 606, canonicalization program 110 initializes cluster means and cluster variances. In this embodiment, canonicalization program 110 uses the mention clusters (generated via applying HAC algorithm over GloVe embeddings) to initialize the cluster means/variances of the Mixture-of-Gaussians model within the Entity/Relation Variational auto-encoders. In this embodiment, the Variational Auto-encoder utilizes a two-layer fully connected neural network within its encoder/decoder structure. In this embodiment, canonicalization program 110 identifies a data embedding lookup table, two multi-layer network (within the encoder/decoder architecture), samples a latent data vector from the Mixture-of-Gaussians model, a reconstructed data vector, and a calculated reconstruction loss for input triple mention.

In step 608, canonicalization program 110 dynamically trains the neural network. In this embodiment, the neural network comprises two variational auto-encoders (one for the entities and the other for the relations), and a knowledge-graph embedding module (which encodes the structural aspect of the Open KG). In this embodiment, canonicalization program 110 dynamically trains the neural network architecture in two steps, that is, in the first step, we train the encoder parameters (by keeping the decoder fixed), and in the next step, we train the decoder parameters (by keeping the encoder fixed). Such a training paradigm helps avoid otherwise degenerate case, which happens when the decoder ignores latent representations and learns directly from the input data.

In this embodiment, canonicalization program 110 trains the neural network by using two loss functions, namely the VAE loss (from the variational autoencoder) and the KBC loss (from the knowledge graph embedding module). A forward pass in this architecture consists of looking up the data embedding vector for the subject, relation, and object mentions, followed by transmitting these vectors through a multi-layer network (of the encoder) and generating latent space representations for each of these mentions. Furthermore, canonicalization program 110 transmits these latent space representations through the multi-layer network (of the decoder) and calculates a reconstruction loss for each. The reconstruction loss together with the ELBO loss (typical within Variational Auto Encoder literature) forms the VAE loss as mentioned above. In addition, since the latent space of a Variational Auto Encoder, in this case, comprises of either a cluster of entities or relations, we build a pseudo entity/relation embedding for each input mentions and use it to encode the structural information within the Open KG via an off-the-shelf Knowledge Base Completion (KBC Model loss) algorithm.

In another embodiment, canonicalization program 110 trains the neural network in two steps, i.e., firstly, it trains the encoder while keeping the decoder fixed. For this step, canonicalization program 110 uses the mention level HAC model (used for initialization) as a source of weak supervision. In the second step, canonicalization program 110 trains the decoder while keeping the encoder fixed. In this step, it uses the VAE loss and KBC loss for training. Furthermore, in both the steps, canonicalization program 110 uses an additional constraint-based loss.

In another embodiment, canonicalization program 110 trains the neural network in two steps, i.e., firstly, it trains the encoder while keeping the decoder fixed. For this step, canonicalization program 110 uses the mention level HAC model (used for initialization) as a source of weak supervision. In the second step, canonicalization program 110 trains the decoder while keeping the encoder fixed. In this step, it uses the VAE loss and KBC loss for training.

Furthermore, in both the steps, canonicalization program 110 uses an additional constraint-based loss. Given two entity (or relation) mentions, canonicalization program 110 can determine that entities or relation mentions are equivalent, that is, different surface forms of the same entity/ relation via following strategies:

Using manually constructed resources, for e.g., Wordnet

Using off-the-shelf supervised systems, for e.g., Entity linkers

Unsupervised setups, for e.g., Token overlaps between IDF Tokens

Once canonicalization program 110 accesses or otherwise generates a list of equivalent triples (t_1, t_2, s), where "s" denotes the equivalence score (obtained via above strategies) between terms t_1 and t_2, canonicalization program 110 computes a weighted Mean Squared Error (MSE) loss, that is, L2 norm of the difference of input embeddings for t_1 and t_2, which is then weighted by scores. This weighted MSE loss is referred to as the Constraint-based loss.

Canonicalization program 110 encodes the structural knowledge present within the Open KG via an off-the-shelf Knowledge Base Completion algorithm. In one embodiment, canonicalization program 110 figures out the most likely entity/relation cluster (one that has the highest cluster-assignment probability) for a given entity/relation mention (within a mention triple) and uses the assigned cluster representation to represent the latent entity/relation. In one embodiment, canonicalization program 110 uses the mean vectors of the gaussian clusters as the assigned cluster representations. Once the representation for latent entity/ relations are identified, canonicalization program 110 aims to maximize the likelihood of the observed mention triple by using an off-the-shelf Knowledge Base Completion (KBC) algorithm. In one embodiment, canonicalization program 110 uses the Holographic Embeddings model as an instance of the KBC algorithm. Furthermore, canonicalization program 110 encodes the latent entity/relation embeddings as the mean vectors of their corresponding gaussians within the Mixture-of-Gaussians model.

FIG. 7 is an example table 700 depicting results of a canonicalization task, in accordance with an embodiment of the present invention.

In this example, canonicalization program 110 utilizes an academic dataset built using ReVerb OpenIE system and Clue-Web corpus. This dataset includes 35,784 triples, 22,183 unique entity mentions, 16,451 unique relation mentions. For each entity mention, canonicalization program 110 provides a unique Freebase ID as a gold label.

Example graph depicts the results of canonicalization program 110 (labeled our approach) in respective columns Macro F1, Micro F1, Pair F1 and average and have corresponding values of 0.661, 0.864, 0.843, and 0.789 respectively. In contrast, CESI (Canonicalization open knowledge bases using Embeddings and Side Information has the following results Macro F1 (0.627), Micro F1 (0.844), Pair F1 (0.819), and Average (0.763). MGNN+SI (Canonicalizing Open Knowledge Bases with Multi-Layered Meta-Graph Neural Network, that is, current solutions) has the following results: Macro F1 (0.667), Micro F1 (0.844, Pair F1 (0.819) and Average (0.763).

Further Comments and/or Embodiments

Embodiments of the present invention recognize certain benefits and improvements to the current state of art: i)

reduces sparsity of knowledge graphs; ii) provides meaningful results for discovery; iii) helps build better models for downstream natural language processing tasks (e.g., link prediction), and iv) groups together model predictions on tasks such as Faceted Search for better performance.

Embodiments of the present invention recognize certain deficiencies in the current state of the art: i) open knowledge graphs typically have an explosion of redundant facts, ii) these redundant facts likely yield to sub-optimal results, and iii) allowing downstream applications to know that multiple noun phrases refer to a single entity improves performance of these downstream applications.

Noun phrases and relation phrases in open knowledge graphs are not canonicalized, leading to an explosion of redundant and ambiguous subject-relation-object triples. Existing approaches to face this problem take a two-step approach: first, they generate embedding representations for both noun and relation phrases, then a clustering algorithm is used to group them using the embeddings as features. In this work, we propose Canonicalizing Using Variational AutoEncoders (CUVA), a joint model to learn both embeddings and cluster assignments in an end-to-end approach, which leads to a better vector representation for the noun and relation phrases. Our evaluation over multiple benchmarks shows that CUVA outperforms the existing state of the art approaches. More-over, we introduce CANONICNELL a novel dataset to evaluate entity canonicalization systems.

1. Introduction

Knowledge Graphs (KGs), YAGO or Freebase are well-curated where both entities and relations are conform to a pre-defined schema. KGs accumulate and represent knowledge of the real world as graphs of entities (nodes) and relations (edges). Despite these standard KGs are valuable resources in supporting open domains tasks, such as question answering their adaptation to new specific domains remains a challenging problem.

In order to address the fast domain adaptation issue, Open Information Extraction (OpenIE) methods can be used to extract triples in the form (noun phrase, relation phrase, noun phrase) from given text corpora in an unsupervised way without requiring a pre-defined ontology schema. This makes them suitable to build large Open Knowledge Graphs (OpenKGs) from huge collections of unstructured text documents, thereby making the usage of OpenIE methods highly adaptable to new domains.

Although OpenIE methods are highly adaptable, one major shortcoming of OpenKGs is that Noun Phrases (NPs) and Relation Phrases (RPs) are not canonicalized. This means that two NPs (or RPs) having different surface forms but referring to the same entity (or relation) in a canonical KB, are treated differently.

Consider the following triples as an example: (NBC-TV, has headquarters in, NYC), (NBC Television, is in, New York City) and (IBM, has main office in, Armonk). Looking at the previous example, both OpenIE methods and associated Open KGs would not have any knowledge that NYC and New York City refer to the same entity or has headquarters in and has main office in are similar relations. Thus, Open KGs have an explosion of redundant facts, which is highly undesirable. Also, querying an Open KG is likely to yield sub-optimal results, since it will not return all facts associated with NYC when using New York City as the query. Moreover, allowing downstream applications such as Link Prediction to know that NYC and New York City refers to the same entity, will improve its performance while operating on large Open KGs. Hence, it is imperative to canonicalize NPs and RPs within an Open KG.

In this paper, we introduce Canonicalizing Using Variational AutoEncoders (CUVA), a neural network architecture that learns unique embeddings for NPs and RPs as well as cluster assignments in a joint fashion. CUVA combines a) The Variational Deep Embedding (VaDE) framework, a generative approach to Clustering, and b) A KG Embedding Model that aims to utilize the structural knowledge present within the Open KGs. In addition, CUVA makes use of additional contextual information obtained from the documents used to build the Open KG.

The input to CUVA is a) An Open KG expressed as a list of triples and b) Contextual Information, if available, and the output is a set of clusters of NPs and RPs grouping all items together that refer to the same entity (or relation).

In summary, we make the following contributions,

We introduce CUVA, a novel neural architecture for the CANONICALIZATION task, based on joint learning of entity and relation clusters using variational autoencoders.

We introduce a new dataset CANONICNELL, derived from a snapshot of NELL system, for the Entity Canonicalization task.

We demonstrate that CUVA improves state of the art (SOTA) on the CANONICALIZATION task, across all datasets

2. Related Work

Extract triples from sentences is the first step to build Open KGs. The OpenIE technique has been originally introduced in 2007. Thereafter, several approaches have been proposed to improve the quality of the extracted triples. Rule-based approaches, such as REVERB use patterns on top of syntactic features to extract relation phrases and their arguments from text. Learning-based methods train a self-supervised system using bootstrapping techniques. Clause-based approaches navigate through the dependency trees to split the sentences into simpler and independent segments. There have been several previous works with an aim to group NPs and RPs into coherent clusters. A traditional approach to canonicalize NPs is to map them to an existing KB. A major problem with these EL approaches is that many NPs may refer to entities that are not present in the KB, in which case they may not get clustered.

The RESOLVER system uses string similarity features to cluster phrases in TextRunner triples. Galárraga manually defined features for NP canonicalization, and subsequently performs relation phrase clustering by using AMIE algorithm. Wu proposes a modification to the previous approach by using pruning and bounding techniques. Concept Resolver makes "one sense per category" assumption, is used for clustering NP mentions in NELL. This approach requires additional information in the form of a schema of relation types. KB-Unify addresses the problem of unifying multiple canonical and open KGs into one KG, but requires additional sense inventory, which may not be available.

The CESI architecture uses a HolE algorithm (Nickel, Rosasco, and Poggio 2016) to learn embeddings for NPs and RPs, and then groups them into clusters by using a Hierarchical Agglomerative Clustering (HAC) algorithm. Unlike Gala'rraga, CESI does not use manually crafted features and therefore has much better performance. Currently, CESI is the state-of-the-art-model on this task.

3. Open Kgs Canonicalization Using VAE

Formally, the CANONICALIZATION task is defined as follows: given a list of triples=(h, r, t) from an OpenIE system on a document collection, where h, t are Noun Phrases (NPs) and r is a Relation Phrase (RP), the objective is to cluster NPs (and RPs), so that items referring to the same entity (or relation) are in the same cluster. We assume that there exists a predefined set of latent entities and latent relations, each having a unique id within a standard KB such as DBpedia.

CUVA uses two variational autoencoders i.e., E-VAE and R-VAE, one each for entities and relations. Both E-VAE and R-VAE use a mixture of Gaussians for modeling latent entities and relations. In addition, we also use a Knowledge Graph Embedding (KGE) module to encode the structural information present within the Open KG. CUVA works as follows:

1. A latent entity (or relation) as defined above, is modeled via a Gaussian distribution. The sampled items from the Gaussian distribution correspond to the observed NPs (and RPs) within T.
2. NPs (h, t) and RPs (r) are modeled using larger embed-ding dimensions compared to their Gaussian counterparts, to account for variations in the observed surface forms.
3. We use Gaussian parameters to refer to the entity (relation) as opposed to the NP (or RP).
4. Since the items are clustered together, we assume that different NPs, e.g., New York City and NYC (or RPs) belonging to the same Gaussian distribution (i.e. cluster) have similar attributes.

3.1 Variational AutoEncoder

We use the generative clustering model, Variational Deep Embedding (VaDE) framework (Jiang et al. 2017) for clustering. The generative process is defined as follows. Assuming that there are K clusters, an observed instance $x \in R^D$ is generated as, 1. Choose a cluster $c \sim Cat(\pi)$, i.e., a categorical distribution parametrized by probability vector $\pi$.
2. Choose a latent vector $z \sim (\mu_c, \sigma^2 I)$ i.e., sample z from a multi-variate Gaussian distribution parametrized by mean $\mu_c$ and diagonal covariance $\sigma^2 I$.
3. Given z, compute $[\mu_x; \log \sigma^2] = f_\theta(z)$ where $f_\theta$ corresponds to a neural network parametrized by $\theta$.
4. Finally, choose a sample $x \sim N(\mu_x, \sigma^2 I)$ i.e., sample x from a multi-variate Gaussian distribution parametrized by mean $\mu_x$ and diagonal covariance $\sigma^2 I$.

where $\pi_k$ is the prior probability for cluster k, $$\pi \in R_+^K \text{ and } \sum_{k=1}^K \pi k = 1.$$

We make the same assumptions as made by Jiang, and assume the variational posterior q(z, c|x) to be a mean field distribution, and factorize it as:

$$q(z, c \mid x) = q(z \mid x) q(c \mid x) \tag{1}$$

We describe below the inner workings of CUVA with respect to the head Noun Phrase, or the left pillar in FIG. 2. An analogous description follows for the tail Noun Phrase, and the Relation Phrase as well The Encoder block is used to model q(z|h) i.e., the variational posterior probability of the latent representation z given input representation h, via the following equations, $$\left[\tilde{\mu}_h; \log\tilde{\sigma}^2\right] = g_\phi^E(h) \tag{2}$$

$$q(z \,|\, h) = N\!\left(z; \tilde{\mu}_h, \tilde{\sigma}^2 I\right) \tag{3}$$

Once the parameters, $\tilde{\mu}_h$, $\tilde{\sigma}_h$ for the variational posterior $q(z\ h)$ are calculated, we use the reparametrization trick (Kingma and Welling 2014) to sample $z_1$ as follows, $$z_1 = \tilde{\mu}_h + \tilde{\sigma}_h \circ \epsilon \tag{4}$$

where t: $\sim N(0, I)$ (i.e., a standard normal distribution) and $\circ$ denotes element-wise multiplication Decoder: Given $z_1$, the decoding phase continues through the Decoder block, as illustrated in FIG. 3, and via the following equations, $$\left[\tilde{\mu}; \log\tilde{\sigma}^2\right] = f_\theta^E(z_1) \tag{5}$$

$$h' \sim N\!\left(\tilde{\mu}, \tilde{\nu}^2 I\right) \tag{6}$$

The variational posterior $q(c\,|\,h)$ is calculated as:

$$q(c \,|\, h) = \frac{p(c)p(z\,|\,c)}{\sum_{c'=1}^{k} p(c')p(z\,|\,c')} \tag{7}$$

In practice, we use $z_1$ obtained from Equation 4 in place of z (in Equation 7), and calculate a vector of assignment probability for an input h.

During inference phase, h is assigned to a cluster having the highest probability, i.e., cluster assignment (in FIG. 1) occurs via a winners-take-all strategy.

3.2 The KGE Module

The motivation behind using a Knowledge Graph Embedding (KGE) module is to encode the structural information present within the Open KG, which is achieved as follows.

Given a triple (h, r, t) belonging to an Open KG, we use Equation 7 to obtain a vector of cluster assignment probabilities $c_h$, $c_r$, and $c_t$ for the NPs and RPs respectively. Then, we employ a soft argmax function (Equation 8) to transform these probability vectors into one hot vectors $v_h$, $v_r$ and $v_t$ as follows, $$f(C_\alpha) = \frac{e\beta_\alpha^{C^i}}{\Sigma_j e^\beta C_\alpha^j} \quad \text{for some large value of } \beta\varepsilon\mathbb{R} \tag{8}$$

where $\alpha\in\{h, r, t\}$ and f denotes the soft argmax function.

Let $M_E$, $M_R$ represent matrices containing mean vectors (stacked across rows) for each of the $K_E$ and $K_R$ Gaussians present in E-VAE and R-VAE respectively. We multiply the one hot vectors $v_h$, $v_r$, $v_t$ with $M_E$, $M_R$ gives us the entity ($e_h$, $e_t$) and relation embeddings ($e_r$) respectively, pertaining to the triple (h, r, t) at each epoch, i.e., $$e_\alpha = v_\alpha M_E \quad \text{where } \alpha\varepsilon\{h, t\} \tag{9}$$

$$e_r = v_r M_R$$

where, $K_E$, $K_R$ (FIG. 1) are hyper-parameters for CUVA. Once, we have the entity and relation embeddings, we use HolE as our choice of KGE algorithm for CUVA.

3.3 Side Information

Noun and Relation Phrases present within an Open KG can be often tagged with relevant side information extracted from the context sentence in which the triple appears. Although the side information can be extracted in various ways, we follow CESI and focus on five sources of side information: Entity Linking, PPDB Information, IDF Token Overlap, WordNet, and Morph Normalization. Each source generates a list of equivalent mention pairs along with a plausibility score per pair. A description of these sources together with their associated scoring strategies is provided in Section B of the Appendix.

Let's consider the example of an equivalent mention pair (NYC, New York City) as shown in FIG. 4 to illustrate the use of side information as a constraint in CUVA. We first perform an embedding lookup for the mentions NYC and New York City and then compute a Mean Squared Error (MSE) value weighted by its plausibility score. The MSE value indicates how far CUVA is from satisfying all the constraints represented as equivalent mention pairs. Finally, we sum up the weighted MSE values for all equivalent mention pairs, which comprises our Side Information Loss $L_{SI}$ in FIG. 1.

4. Training Strategy

In this section, we describe our strategy for training the CUVA model. Let $\varepsilon$, R denote the entity and relation vocabulary for an Open KG. We train the model in three stages, as follows:

4.1 Initializing Mixture of Gaussians

We use the pretrained 100-dimensional GloVe vectors for embedding matrices $E_g$ and $R_g$ corresponding to the vocabulary E and R respectively. The embeddings for multi-token phrases are calculated by averaging unit L2 normalized vectors for each token.

For the CANONICALIZATION task, the cluster sizes will be likely small, and in turn, we get a large number of clusters. The average-case time complexity per iteration of k-Means using Lloyd's algorithm is O(nk), where n is the number of samples. However, for our case, as k is comparable to n, the average time complexity becomes $O(n^2)$ similar to the Hierarchical Agglomerative Clustering (HAC) method with complete linkage criterion. Though both methods have the same time complexity, we use HAC as our clustering method as we observe that it gives a better performance empirically. We cover the empirical comparison between both methods in Section 5.2.

We run HAC separately over $\varepsilon_g$ for NPs, and $R_g$ over RPs. We use two different thresholds $\theta_E$ for entities, and $\theta_R$ for relations to convert the output dendrograms from HAC into flat clusters. Using these clusters, we compute within-cluster means and variances to initialize the means and the variances of the Gaussians for both E-VAE and R-VAE respectively. Note that, the choice of $\theta_E$ and $\theta_R$ sets the values for the number of mixtures $K_E$ and $K_R$ used in the next stage.

4.2 Two-Step Training

We train the model in two independent steps. Our training strategy is similar to training the encoder and decoder of the VAE alternatively rather than simultaneously. In the first step, we train the encoder in both E-VAE and R-VAE while keeping the decoder fixed. Then, in the second step, we keep the encoder fixed and only train the decoder.

Encoder training: We train the Encoder for both E-VAE and R-VAE by using the labels generated via HAC algorithm as a source of weak supervision. Specifically, for a given triple (h, r, t), we compute:

Negative log likelihood (NLL) loss h calculated using the predicted cluster assignment probability vector (Equation 7) for h and the cluster label for h.

NLL values $L_r$, $L_t$ for r, t computed in a similar manner.

L1 Regularizer values using the Encoder parameters for E-VAE and R-VAE, denoted by $L_{REG1}$.

Side Information Loss (Sec 3.3) si applicable between any two equivalent NPs (or RPs).

The overall loss function for the first step is therefore:

$$J = \sum\nolimits_{(n,r,t)\in T} L_h + L_r + L_t + \lambda L_{REG} + L_{s_1} \tag{10}$$

We train the Encoder for a maximum of 50 epochs, and then proceed to the second step Decoder training: In this step, we train the decoder only, and keep the encoder fixed. The cluster parameters and the embedding lookup table are also updated. The decoder is trained by minimizing the following loss value:

The evidence lower bound (ELBO) loss $$L_{ELBO}^E, L_{ELBO}^R$$

for E-VAE and R-VAE, with the decoder being a multivariate Gaussian with a diagonal covariance structure. The ELBO loss breaks into, a) The Reconstruction Loss (FIG. 4), and b) The Kullback-Liebler (KL) divergence between the variational posterior and the prior. The expressions for ELBO loss are based on Jiang et al. (2017).

KGE Module loss $L_{KGE}$ (Section 3.2) and the Side Information Loss $L_{SI}$ (Section 3.3).

L1 Regularizer loss values ($L_{REG2}$) using the Decoder parameters for E-VAE and R-VAE.

The combined loss function for the second step is:

$$J = L_{ELBO}^E + L_{ELBO}^R + L_{KGE} + L_{s_1} + \lambda L_{REG2} \tag{11}$$

where $\lambda$ corresponds to the weight value for the regularizer, a hyper-parameter set to 0.001. The decoder is trained for a maximum of 300 epochs The motivation behind using a two-step training strategy for the VAEs is to prevent the decoder from ignoring latent representations z and learning directly from the input data. Once the encoder has been trained in the first step, we keep the encoder weights fixed for the second step. This forces the decoder to learn only from the latent representations, and not from the input data. Note that the KGE loss KGE is not used in Step one, since it causes the model to diverge in practice.

5. Evaluation

The CANONICALIZATION task is inherently unsupervised, i.e., we are not given any manually annotated data for training. With this in mind, we evaluate our approach on two datasets, i.e., ReVerb45K and CANONICNELL, a new dataset that we introduce in this work.

5.1 Benchmarks

For comparing the performance of CUVA against the existing state of the art approaches, we use ReVerb45K, an academic benchmark dataset introduced by Vashishth, Jain, and Talukdar (2018a). In addition, we introduce a new dataset called CANONICNELL, which we built by using the 165th iteration snapshot of NELL, i.e., Never-Ending Language Learner system.

Description of CANONICNELL. The above snapshot of NELL, hereby referred to as NELL165, contains accumulated knowledge as a list of subject-relation-object triples. For building CANONICNELL, we use the data artifact generated by Pujara et al. (2013) which marks co-referent entities within NELL165 triples, together with a soft-truth value per entity pair. We filter out all pairs having a score less than 0.25 and consider the remaining pairs as undirected edges in a graph. We then apply depth-first-search to obtain a set of connected components, which we refer to as the set of Gold Clusters. As the next step, we filter through the list of NELL165 triples and keep only those whose head or tail entity is present within the set of Gold Clusters. These triples together with the Gold Clusters obtained previously, form our newly proposed CANONICNELL dataset.

Table 1 illustrates the dataset statistics. We mention the count of NPs for ReVerb45K as 28.7K and the number of Gold Clusters as 20K as opposed to 15.5K and 7.5K respectively (Vashishth, Jain, and Talukdar 2018a) because we count NPs that occupy either head or tail slots as opposed to the previous work which was on head slot NPs only. Thus, we differentiate between the Canonicalization task for head entity mentions and all entity mentions on ReVerb45K and illustrate the results in Tables 2 and 3 respectively.

TABLE 1

Details of datasets used. CanonicNell is the newdataset that we introduce in this paper, whereas ReVerb45Kis from 2018.

| Dataset | ReVErb45K | CANONICNELL |
|---|---|---|
| Gold NP Clusters | 20K | 1,432 |
| Noun Phrases | 28.7K | 8,745 |
| Relation Phrases | 21.9K | 139 |
| Triples | 45K | 20,060 |

We randomly divide the triples for each dataset in an 80:20 ratio to build the test set and the validation set respectively. We perform grid search over the hyper-parameter space on the validation set for all approaches in Sections and 5.3, and report results corresponding to the best-performing settings on the test set. For evaluations, we use the macro, micro and pair F1 scores (Galárraga et al. 2014a) as described in Section A of the Appendix.

Furthermore, for the ReVerb45K dataset, we use all the sources of Side Information (Section 3.3) for canonicalizing NPs and use PPDB Information, IDF Token Overlap for canonicalizing RPs. For the CANONICNELL dataset, we use IDF Token Overlap for canonicalizing NPs and do not canonicalize RPs, since they are already canonicalized.

A detailed description of the range of values tried per hyper-parameter, and the final values used within CUVA is provided in Section C of the Appendix.

5.2 Results on ReVerb45K

The results for the Entity Canonicalization task on Re-Verb45K are shown in Tables 2 and 3 respectively. Table 2 shows the results on ReVerb45K when evaluated for head entities only, i.e., Noun Phrases that appear in the head slot of a typical (head, relation, tail) triple. On the other hand, Table 3 illustrates the results when evaluated for all entity mentions (i.e., all NPs) within Reverb45K. Furthermore, in the descriptions below, the use of HAC assumes that the Hierarchical Agglomerative Clustering algorithm was run using a complete linkage criterion and a cosine distance metric.

Without Side Information. The first line in Table 2, i.e. Galárraga-IDF (Galárraga et al. 2014a) depicts the performance of a feature-based method on this task. GloVe+HAC in Table 2 uses a pretrained GloVe model to first build embeddings for entity mentions and then uses a HAC algorithm to cluster them. For multi-token phrases, GloVe embedding for tokens are averaged together. GloVe captures the semantics of Noun Phrases and does not rely on the surface form of NPs, thereby performing much better than Galárraga-IDF.

The HolE (GloVe) approach uses the HolE Knowledge Graph Embedding model (initialized with pretrained GloVevectors) to learn unique embeddings for NPs and RPs, followed by clustering using a HAC algorithm. Though this method performs much better than the feature-based Galárraga-IDF method, interestingly, it performs significantly worse than GloVe+HAC.

TABLE 2

Macro, Micro and Pair F1 results on the Entity Canonicalization task for head entity mentions on Re- Verb45K. Rows marked with a are from Vashishth, Jain, and Talukdar (2018a). Results reported by CUVA + SI are amean of three independent runs. SI indicates whether an approach uses Side Information (Section 3.3) or not.

| | S1 | Macro | Micro | Pair | Mean |
|---|---|---|---|---|---|
| Galárraga-IDF[†] | No | 0.716 | 0.508 | 0.005 | 0.410 |
| HolE (GloVe)[†] | No | 0.335 | 0.758 | 0.510 | 0.534 |
| GloVe + HAC[†] | No | 0.565 | 0.829 | 0.753 | 0.716 |
| CUVA | No | 0.572 | 0.838 | 0.820 | 0.743 |
| CESI[†] | Yes | 0.627 | 0.844 | 0.819 | 0.763 |
| CUVA + SI | Yes | 0.661 | 0.866 | 0.855 | 0.794 |

TABLE 3

Macro, Micro and Pair F1 results on the Entity Canonicalization task for all entity mentions on ReVerb45K. Both CESI and CUVA use Side Information as well as the same hyperparameter settings as in Table 2.

| | S1 | Macro | Micro | Pair | Mean |
|---|---|---|---|---|---|
| CESI | Yes | 0.749 | 0.828 | 0.763 | 0.780 |
| CUVA + SI | Yes | 0.757 | 0.844 | 0.812 | 0.804 |

With Side Information. The current state of the art, i.e. CESI (Vashishth, Jain, and Talukdar 2018a) extends the HolE (GloVe) approach, by adding Side Information (Section 3.3) as an additional loss objective to be minimized. Looking at the results, it is clear that the addition of Side Information provides a significant boost in performance for this task.

Row four depicts the performance of CUVA, whereas the final row reports the application of CUVA together with the Side Information on ReVerb45K. Both approaches are the original contribution of our work. Note that the usage of Side Information augments CUVA's performance by a much bigger margin ~9% on the Macro F1 metric, as opposed to ~3% on the Micro and Pair F1 metrics respectively.

The results clearly show that CUVA+SI outperforms CESI and achieves the new state of the art results on this benchmark. Furthermore, an improvement in the Mean F1 value over CESI is statistically significant with two-tailed p value being less than 1e-3. Table 3 shows a similar trend, when evaluated on all entity mentions belonging to both head and tail slots within Reverb45K A plausible explanation for this improved performance might be due to the fact that CUVA learns mention embeddings as well as cluster assignments in a joint fashion, rather than a two-step pipeline approach followed by current methods. We believe that a joint approach is more suitable for this task since it allows gradients to update both the mention embeddings as well as the soft cluster assignments simultaneously, as opposed to the existing two-step pipeline state of the art approaches in which there does exist a disconnect (i.e., no parameter sharing) between both the steps.

Additional results on CUVA with varying strategies on the choice of initializations for the Mixture of Gaussians (Section 4.1) and Knowledge Graph Embedding (Section 3.2) is provided in Section D.1 of the Appendix.

TABLE 4

Macro, Micro and Pair F1 results on the Entity Canonicalization task for the CANONICNELL dataset. The thresholds for HAC in the first three rows are 0.15, 0.21 and 0.2 respectively. As before, SI indicates whether an approach uses Side Information (Section 3.3) or not. Results reportedby CUVA + SI are a mean of three independent runs.

| | S1 | Macro | Micro | Pair | Mean |
|---|---|---|---|---|---|
| FastText + HAC | No | 0.725 | 0.798 | 0.219 | 0.581 |
| GloVe + HAC | No | 0.747 | 0.811 | 0.280 | 0.613 |
| CESI | Yes | 0.749 | 0.817 | 0.307 | 0.624 |
| CUVA + SI | Yes | 0.777 | 0.829 | 0.367 | 0.658 |

5.3 Results on CanonicNell

Table 4 shows the results for the Entity Canonicalization task when evaluated on the CANONICNELL dataset. The first two rows correspond to approaches that use pretrained GloVe \and Fast-Text models to build unique embeddings for NPs, and then use HAC to generate clusters. On the other hand, in the absence of contextual information for the CANONICNELL triples, both CESI and CUVA approaches use IDF Token Overlap as the only source of Side Information. Both the HolE (GloVe) and Galárraga-IDF approaches as mentioned in the previous section performed worse than GloVe+HAC, therefore, we exclude them from Table 4.

Furthermore, from Table 4, it is clear that CUVA achieves the new state of the art result on this benchmark as well. A boost in the Mean F1 value over CESI is statistically significant with two-tailed p value equaling 0.019.

Note that GloVe+HAC achieves similar results as CESI in Table 4. A plausible explanation for it might be the lack of sufficient Side Information available for this dataset. Moreover, clustering for Noun Phrases happens at a mention level for ReVerb45K, whereas for CANONICNELL it happens at an entity level, thus Pair F1 values for this dataset tend to lie on the lower side of the spectrum. In other words, it is much easier to cluster all mentions of a given NP into a single cluster (for ReVerb45K), which contributes to relatively high Pair F1 when compared against CANONICNELL.

5.4 Comparison with Pretrained LMs

With pretrained language models almost becoming ubiquitous in today's state of the art NLP applications, we investigate how CUVA fares against pretrained language models. Table 5 illustrates the results when evaluated on ReVerb45K.

We use the lower layers of a pretrained BERT (RoBERTa) base model i.e., layers one through six as opposed to the higher layers. For each layer, we use a mean pooling strategy to aggregate the contextualized representations, which provides a static term representation for each of the entity mentions. The entity mentions are finally clustered using HAC to obtain the clusters.

TABLE 5

Macro, Micro and Pair F1 results for comparison with pretrained language models on the Entity Canonicalization task for head entity mentions on ReVerb45K.

|  | Macro | Micro | Pair | Mean |
|---|---|---|---|---|
| RoBERTa + HAC | 0.448 | 0.804 | 0.776 | 0.676 |
| CUVA | 0.572 | 0.838 | 0.820 | 0.743 |
| BERT + HAC | 0.586 | 0.839 | 0.822 | 0.749 |
| CUVA + SI | 0.661 | 0.866 | 0.855 | 0.794 |

Empirically, we found layer one to work best for both BERT and RoBERTa models. Furthermore, RoBERTa performs worse than corresponding BERT models when comparing the derived static embeddings on this task. In comparison, CUVA+SI performs significantly better, i.e., +4.5% and +11.8% improvement on the average of Macro, Micro, and Pair F1 values, when compared against BERT+HAC and RoBERTa+HAC respectively.

5.5 Qualitative Analysis

We illustrate the output of our system for canonicalizing NPs (and RPs) for ReVerb45K in Table 6. The first top block corresponds to six NP clusters, one per line. The algorithm is able to correctly group kodagu and coorg (different name of the same district in India), despite having completely different surface forms. The grouping of NPs having similar to-kens sometimes proves beneficial i.e., Row two which groups justice alito and samuel alito together, whereas other times it proves detrimental, i.e., Row five which groups four different people each having the same name bill. The latter scenario can be mitigated by keeping track of the type information (Dash et al. 2020; Le et al. 2019) of each NP obtained from text, for disambiguation.

The bottom four rows in Table 6 correspond to four RP clusters, one per line. While the equivalence of RPs is captured in the first two rows of the bottom block, the final two rows highlight a potential issue involving antonyms, i.e., rank below and be rank above have opposite meanings. We leave the resolution of this issue as future work.

TABLE 6

Examples of clusters predicted by CUVA on ReVerb45K.
The top and bottom blocks contains NP and RP clusters
(one per line) respectively.
Predicted Clusters utc, coordinate universal time, universal coordinate time justice alito, samuel alito, sam alito, alito kodagu, coorg johnny storm, human torch bill cosby, bill maher, bill doolin, bill nye toyota, honda, toyota motor corporation swear loyalty to, swear an oath to, swear fealty to reconcile with, reunite with do not hate, must really hate, be hate by, do hate rank below, rank just below, be rank above

TABLE 7

Ablation tests on the Entity Canonicalization task illustrating
Macro, Micro and Pair F1 results for the CANON- ICNELL
dataset. All approaches here use Side Information as well
as the same hyperparameter settings as in Table 4.

| Approaches + SI | Macro | Micro | Pair |
|---|---|---|---|
| CUVA (1 Hidden Layer) | 0.777 | 0.829 | 0.367 |
| Hidden Layer | 0.755 | 0.800 | 0.227 |
| KGE Module | 0.779 | 0.826 | 0.262 |

5.6 Ablation Tests

Table 7 illustrates the ablation experiments performed on the Entity Canonicalization task for the CANONICNELL dataset. The first row corresponds to CUVA+SI model that was used to obtain state-of-the-art results, as reported in Table 4. As mentioned previously, this model uses a fully connected neural network with one hidden layer in the encoder and de-coder sections of the VAE. Removing this hidden layer out of CUVA yields the results in the second row of the table.

The final row reports the performance with having taken the KBC Module out of CUVA.

From the results, it is clear that a KGE Module, which is responsible for encoding the structural knowledge within an Open KG, is essential for a robust canonicalization system. Moreover, adding a hidden layer to the encoder and the decoder certainly helps. Nevertheless, it is interesting to explore how many non-linear layers can we add before we start getting diminishing returns.

6. Conclusion and Future Work

In this paper, we introduced CUVA, a novel neural net-work architecture to canonicalize Noun Phrases and Relation Phrases within an Open Knowledge Graph (KG). We argued that CUVA learns unique mention embeddings as well as cluster assignments in a joint fashion, as opposed to a two-step pipeline approach followed by the current state of the art methods. Furthermore, we also introduced CANON-ICNELL, a new dataset for Entity Canonicalization. An evaluation over two benchmarks demonstrates that CUVA outperforms the current state of the art methods.

In the future, we plan to explore how to build upon CUVA in two directions. On one hand, we plan to figure out how to improve the quality of the generated clusters, by exploring of post-processing strategies such as Hypernymy Detection. In addition, we plan to explore the field of Link Prediction on Open KGs using CUVA.

Figure 8:
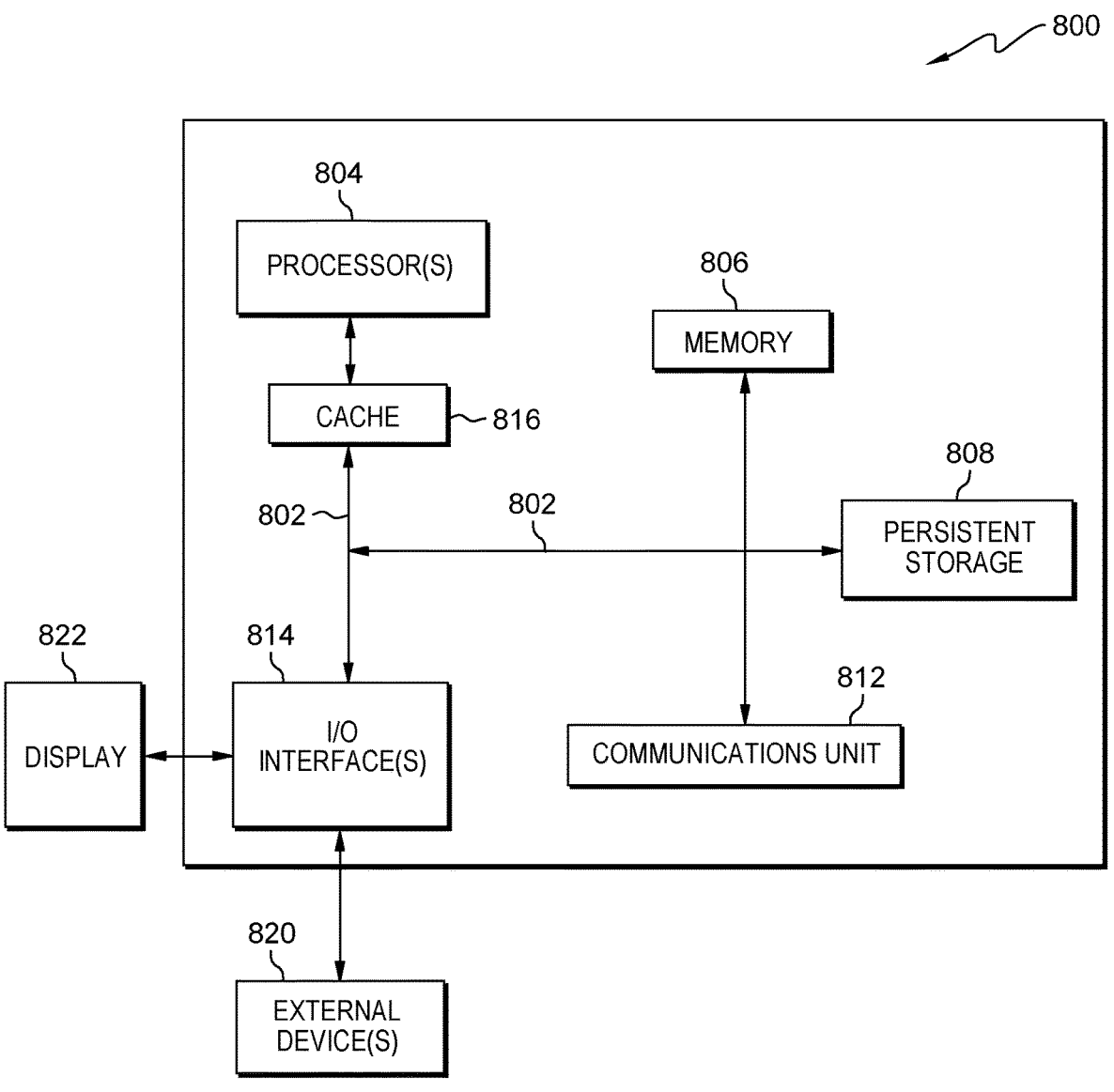
FIG. 8 is a block diagram of an example computing system, in accordance with an embodiment of the present invention.

FIG. 8 depicts a block diagram of components of computing systems within computing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 800 includes communications fabric 802, which provides communications between cache 816, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Canonicalization program 110 (not shown) may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. Canonicalization program 110 may be downloaded to persistent storage 808 through communications unit 812.

I/O interface(s) 814 allows for input and output of data with other devices that may be connected to client computing device and/or server computer. For example, I/O interface 814 may provide a connection to external devices 820 such as a keyboard, keypad, a touch screen, and/or some other suitable input device. External devices 820 can also include portable computer readable storage media such as, for example, thumb drives, portable optical or magnetic disks, and memory cards. Software and data used to practice embodiments of the present invention, e.g., canonicalization program 110, can be stored on such portable computer readable storage media and can be loaded onto persistent storage 808 via I/O interface(s) 814. I/O interface(s) 814 also connect to a display 822.

Display 822 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:

in response to receiving information, learning entity representations, and cluster assignments of respective entity representations in a joint manner for entities and relations of respective entities, wherein the learning comprises:

training a resulting neural network architecture using a variational autoencoder (VAE) loss function and a Knowledge Base Completion (KBC) loss function, the training comprising:

building a hierarchical agglomerative clustering model with complete linkage criterion using pre-trained GloVe embeddings;

training an encoder section while keeping a decoder section fixed by using clustering results as a source of weak supervision using a constraint-based loss; and training the decoder sections only while keeping the encoder sections fixed using the constraint-based loss, wherein the constraint-based loss comprises:

calculating a first score during the encoder section training and a second score during the decoder section training; and calculating a weighted mean squared error between the first score and the second score that is L2 norm of a different of input embeddings.

2. The computer-implemented method of claim 1, wherein received information includes OpenIE triples obtained from a corpus of text.

3. The computer-implemented method of claim 1, wherein learning entity representations and cluster assignments of respective entity representations in a joint manner for entities and relations of respective entities comprises:

canonicalizing entity and relation mentions embedded in the received information.

4. The computer-implemented method of claim 3, wherein canonicalizing entity and relation mentions embedded in the received information comprises:

clustering entity mentions using a first variational auto-encoder for respective entities in the received information;

clustering relation mentions using a second variational auto-encoder for respective relation mentions in the received information, wherein the first variational auto-encoder and the second variational auto-encoder use a Mixture-of-Gaussians algorithm within its latent space; and leveraging structural knowledge present within an open knowledge base of mentions.

5. The computer-implemented method of claim 3, further comprising:

calculating an average of unit-normalized GloVe embeddings of tokens for multiple token terms based on the entity mentions and the relation mentions using the multiple token terms.

6. The computer-implemented method of claim 5, further comprising:

encoding a constraint loss that enforces certain mention pairs to be within proximity of each other in an embedding space.

7. A computer program product comprising:

one or more computer readable storage media and program instructions stored on the one or more computer readable storage media, the program instructions comprising:

program instructions to, in response to receiving information, learn entity representations, and cluster assignments of respective entity representations in a joint manner for entities and relations of respective entities, wherein the learning comprises:

training a resulting neural network architecture using a variational autoencoder (VAE) loss function and a Knowledge Base Completion (KBC) loss function, the training comprising:

building a hierarchical agglomerative clustering model with complete linkage criterion using pre-trained GloVe embeddings;

training an encoder section while keeping a decoder section fixed by using clustering results as a source of weak supervision using a constraint-based loss; and training the decoder sections only while keeping the encoder sections fixed using the constraint-based loss, wherein the constraint-based loss comprises:

calculating a first score during the encoder section training and a second score during the decoder section training; and calculating a weighted mean squared error between the first score and the second score that is L2 norm of a different of input embeddings.

8. The computer program product of claim 7, wherein received information includes OpenIE triples obtained from a corpus of text.

9. The computer program product of claim 7, wherein the program instructions stored on the one or more computer readable storage media further comprise learn entity representations and cluster assignments of respective entity representations in a joint manner for entities and relations of respective entities comprise:

program instructions to canonicalize entity and relation mentions embedded in the received information.

10. The computer program product of claim 9, wherein the program instructions to canonicalize entity and relation mentions embedded in the received information comprise:

program instructions to cluster entity mentions using a first variational auto-encoder for respective entities in the received information;

program instructions to cluster relation mentions using a second variational auto-encoder for respective relation mentions in the received information, wherein the first variational auto-encoder and the second variational auto-encoder use a Mixture-of-Gaussians algorithm within its latent space; and program instructions to leverage structural knowledge present within an open knowledge base of mentions.

11. The computer program product of claim 9, program instructions stored on the one or more computer readable storage media further comprise:

program instructions to calculate an average of unit-normalized GloVe embeddings of tokens for multiple token terms based on the entity mentions and the relation mentions using the multiple token terms.

12. The computer program product of claim 11, wherein the program instructions stored on the one or more computer readable storage media further comprise:

program instructions to encode a constraint loss that enforces certain mention pairs to be within proximity of each other in an embedding space.

13. A computer system comprising:

one or more computer processors;

one or more computer readable storage media; and program instructions stored on the one or more computer readable storage media for execution by at least one of the one or more computer processors, the program instructions comprising:

program instructions to, in response to receiving information, learn entity representations, and cluster assignments of respective entity representations in a joint manner for entities and relations of respective entities, wherein the learning comprises:

training a resulting neural network architecture using a variational autoencoder (VAE) loss function and a Knowledge Base Completion (KBC) loss function, the training comprising:

building a hierarchical agglomerative clustering model with complete linkage criterion using pre-trained GloVe embeddings;

training an encoder section while keeping a decoder section fixed by using clustering results as a source of weak supervision using a constraint-based loss; and training the decoder sections only while keeping the encoder sections fixed using the constraint-based loss, wherein the constraint-based loss comprises:

calculating a first score during the encoder section training and a second score during the decoder section training; and calculating a weighted mean squared error between the first score and the second score that is L2 norm of a different of input embeddings.

14. The computer system of claim 13, wherein received information includes OpenIE triples obtained from a corpus of text.

15. The computer system of claim 13, wherein the program instructions stored on the one or more computer readable storage media further comprise learn entity representations and cluster assignments of respective entity representations in a joint manner for entities and relations of respective entities comprise:

program instructions to canonicalize entity and relation mentions embedded in the received information.

16. The computer system of claim 15, wherein the program instructions to canonicalize entity and relation mentions embedded in the received information comprise:

program instructions to cluster entity mentions using a first variational auto-encoder for respective entities in the received information;

program instructions to cluster relation mentions using a second variational auto-encoder for respective relation mentions in the received information, wherein the first variational auto-encoder and the second variational auto-encoder use a Mixture-of-Gaussians algorithm within its latent space; and program instructions to leverage structural knowledge present within an open knowledge base of mentions.

17. The computer system of claim 15, program instructions stored on the one or more computer readable storage media further comprise:

program instructions to calculate an average of unit-normalized GloVe embeddings of tokens for multiple token terms based on the entity mentions and the relation mentions using the multiple token terms.

* * * * *